(12) United States Patent
Cho et al.

(10) Patent No.: US 11,820,399 B2
(45) Date of Patent: Nov. 21, 2023

(54) VEHICLE

(71) Applicants: HYUNDAI MOTOR COMPANY, Seoul (KR); KIA CORPORATION, Seoul (KR); HYUNDAI AUTOEVER CORP., Seoul (KR)

(72) Inventors: Daegil Cho, Suwon-si (KR); Seung Hwan Shin, Seoul (KR); Bong-Ju Kim, Yongin-si (KR)

(73) Assignees: HYUNDAI MOTOR COMPANY, Seoul (KR); KIA CORPORATION, Seoul (KR); HYUNDAI AUTOEVER CORP., Seoul (KR)

( * ) Notice: Subject to any disclaimer, the term of this patent is extended or adjusted under 35 U.S.C. 154(b) by 94 days.

(21) Appl. No.: 17/512,210

(22) Filed: Oct. 27, 2021

(65) Prior Publication Data
US 2022/0185320 A1  Jun. 16, 2022

(30) Foreign Application Priority Data

Dec. 10, 2020 (KR) .................... 10-2020-0172544

(51) Int. Cl.
*B60W 60/00* (2020.01)
*B62D 15/02* (2006.01)
*G06V 20/58* (2022.01)

(52) U.S. Cl.
CPC ......... *B60W 60/001* (2020.02); *B62D 15/021* (2013.01); *G06V 20/58* (2022.01); *B60W 2420/42* (2013.01); *B60W 2554/4049* (2020.02)

(58) Field of Classification Search
CPC ........... B60W 60/001; B60W 2420/42; B60W 2554/4049; B60W 60/0015; B60W 40/02; B60W 50/0097; B60W 2050/0002; B60W 2050/0022; B60W 2540/18; B60W 2554/4044; B60W 2720/10; B62D 15/021; B62D 15/025; G06V 20/58; G06V 20/56;
(Continued)

(56) References Cited

U.S. PATENT DOCUMENTS 10,726,276 B2 * 7/2020 Han .................... G08G 1/0962
10,870,351 B2 * 12/2020 Viswanathan ..... G01C 21/3658
(Continued)

OTHER PUBLICATIONS

Soon-Oh Kim et al., Development of control algorithm based on vehicle inter-communication for the improvement of performance and stability of bimodal tram platoon system, Proceedings of the Fall Conference of the Korea Railroad Association; 2013; 6 pp.

*Primary Examiner* — Thomas Ingram
(74) *Attorney, Agent, or Firm* — LEMPIA SUMMERFIELD KATZ LLC (57) ABSTRACT

Provided is a vehicle capable of performing safe and efficient autonomous driving by acquiring accurate information about surrounding objects based on behavior control of the vehicle. The vehicle includes: a camera configured to acquire a surrounding image of the vehicle which includes one or more objects; at least one sensor configured to acquire position data of the one or more objects; and a controller configured to identify identification areas respectively corresponding to the one or more objects based on the surrounding image and the position data, and if a part of the identification area overlaps an occlusion area, control the vehicle to separate the identification area and the occlusion area from each other, to perform autonomous driving.

10 Claims, 8 Drawing Sheets

(58) Field of Classification Search
CPC .............. B60R 21/0134; G05D 1/0055; G05D 1/0088; G05D 2201/0213
See application file for complete search history.

(56) References Cited

U.S. PATENT DOCUMENTS

| | | | | |
|---|---|---|---|---|
| 11,513,519 | B1* | 11/2022 | Akella | G08G 1/166 |
| 11,524,701 | B2* | 12/2022 | McGill | B60W 30/18163 |
| 11,611,267 | B2* | 3/2023 | Shin | H02K 15/0043 |
| 2015/0012200 | A1* | 1/2015 | Joshi | B60R 11/04 |
| | | | | 348/148 |
| 2017/0371338 | A1* | 12/2017 | Kamata | G05D 1/0274 |
| 2018/0120842 | A1* | 5/2018 | Smith | G01S 7/412 |
| 2019/0064840 | A1* | 2/2019 | Becker | G05D 1/0248 |
| 2020/0004259 | A1* | 1/2020 | Gulino | G06F 18/00 |
| 2020/0064910 | A1* | 2/2020 | Lyren | H04W 4/023 |
| 2020/0097756 | A1* | 3/2020 | Hashimoto | G06V 10/25 |
| 2020/0189467 | A1* | 6/2020 | Kondo | G06T 11/00 |
| 2020/0225669 | A1* | 7/2020 | Silva | B60W 60/0011 |
| 2020/0278681 | A1* | 9/2020 | Gier | G05D 1/0246 |
| 2020/0377092 | A1* | 12/2020 | Torres | B60W 50/0097 |
| 2021/0256327 | A1* | 8/2021 | Peranandam | G01V 1/001 |
| 2022/0185267 | A1* | 6/2022 | Beller | B60W 60/0015 |
| 2022/0185320 | A1* | 6/2022 | Cho | G06V 20/58 |
| 2022/0269279 | A1* | 8/2022 | Redford | G05D 1/0044 |
| 2023/0068848 | A1* | 3/2023 | Alismail | B08B 1/006 |

* cited by examiner

VEHICLE

CROSS-REFERENCE TO RELATED APPLICATION

The present application claims the benefit of and priority to Korean Patent Application No. 10-2020-0172544, filed on Dec. 10, 2020, the entire contents of which are incorporated herein by reference.

BACKGROUND

1. Field

The present disclosure relates to a vehicle that performs autonomous driving.

2. Description of Related Art

The statements in this section merely provide background information related to the present disclosure and may not constitute prior art.

Autonomous driving technology for vehicles is a technology that enables a vehicle to automatically travel by identifying the road conditions without a driver controlling a brake, a steering wheel, an accelerator pedal, or the like by a driver.

Autonomous driving technology is a key technology for the realization of smart cars, and for autonomous vehicles. The autonomous driving technology includes a highway driving support system (HAD) for automatically maintaining the distance between vehicles, a blind spot detection (BSD) for sensing a neighboring vehicle during backward driving and producing an alert, an automatic emergency braking (AEB) for operating a braking apparatus in case of a failure to recognize a preceding vehicle, a lane departure warning system (LDWS), a lane keeping assist system (LKAS) for preventing a drift out of a lane without a turn signal, an advanced smart cruise control (ASCC) for performing auto cruise at a designated velocity while maintaining a distance between vehicles, a traffic jam assistant (TJA) system, a parking collision-avoidance assist (PCA) system, and a remote smart parking assist system.

On the other hand, in performing such autonomous driving, technology is being developed on what types of sensors are configured in a vehicle and how to fusion the sensors.

We have discovered that when the sensors acquire external information, occlusion by objects may occur, and thus a technology of collecting data without occlusion is desired in order to perform smooth autonomous driving.

SUMMARY

The present disclosure provides a vehicle that performs safe and efficient autonomous driving by acquiring accurate information about surrounding objects based on behavior control of the vehicle In an aspect of the disclosure, a vehicle includes: a camera configured to acquire a surrounding image of the vehicle wherein the image includes at least one object; a sensor unit configured to acquire position data of the at least one object; and a controller configured to identify identification area corresponding to the at least one object based on the surrounding image and the position data. When a part of the identification area overlaps an occlusion area, the controller controls the vehicle to separate the identification area and the occlusion area from each other, and performs autonomous driving.

The controller may be configured to identify types of the at least one object based on the surrounding image.

The controller may be configured to: assign a weight to the at least one object based on a predetermined criterion, and control the vehicle to separate the identification area and the occlusion area from each other based on the assigned weight.

The controller may be configured to predict a movement path of the at least one object in the surrounding image based on the position data.

The controller may be configured to predict an overlap between the identification area and the occlusion area based on the predicted movement path of the at least one object.

The controller may be configured to change a distance between the vehicle and the at least one object to separate the occlusion area and the identification area from each other.

The controller may be configured to, if the vehicle approaches a predetermined road, control to separate the occlusion area and the identification area from each other by decreasing a velocity of the vehicle.

The controller may be configured to control to separate the occlusion area and the identification area from each other by changing a steering angle of the vehicle.

In another aspect of the disclosure, a method of controlling a vehicle performing autonomous driving includes: acquiring, by a camera, a surrounding image of the vehicle where the surrounding image includes at least two objects; acquiring, by a sensor, position data of the at least two objects; identifying, by a controller, identification areas respectively corresponding to the at least two objects based on the surrounding image and the position data; and determining, by the controller, whether a part of the identification areas overlaps an occlusion area, and controlling the vehicle to separate the overlapped part of the identification areas from the occlusion area.

The identifying of the identification areas may include predicting a movement path of the at least two objects in the surrounding image based on the position data.

The controlling of the vehicle to separate the identification areas and the occlusion area from each other may include predicting an overlap between the identification areas and the occlusion area based on the predicted movement path of the at least two objects.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Like numerals refer to like elements throughout the specification. Not all elements of embodiments of the present disclosure is described, and description of what are commonly known in the art or what overlap each other in the embodiments is omitted. The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements.

It should be further understood that the term "connect" or its derivatives refer both to direct and indirect connection, and the indirect connection includes a connection over a wireless communication network.

It should be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

In the specification, it should be understood that, when a member is referred to as being "on/under" another member, it may be directly on/under the other member, or one or more intervening members may also be present.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the principles and embodiments of the disclosure are described with reference to the accompanying drawings.

Figure 1:
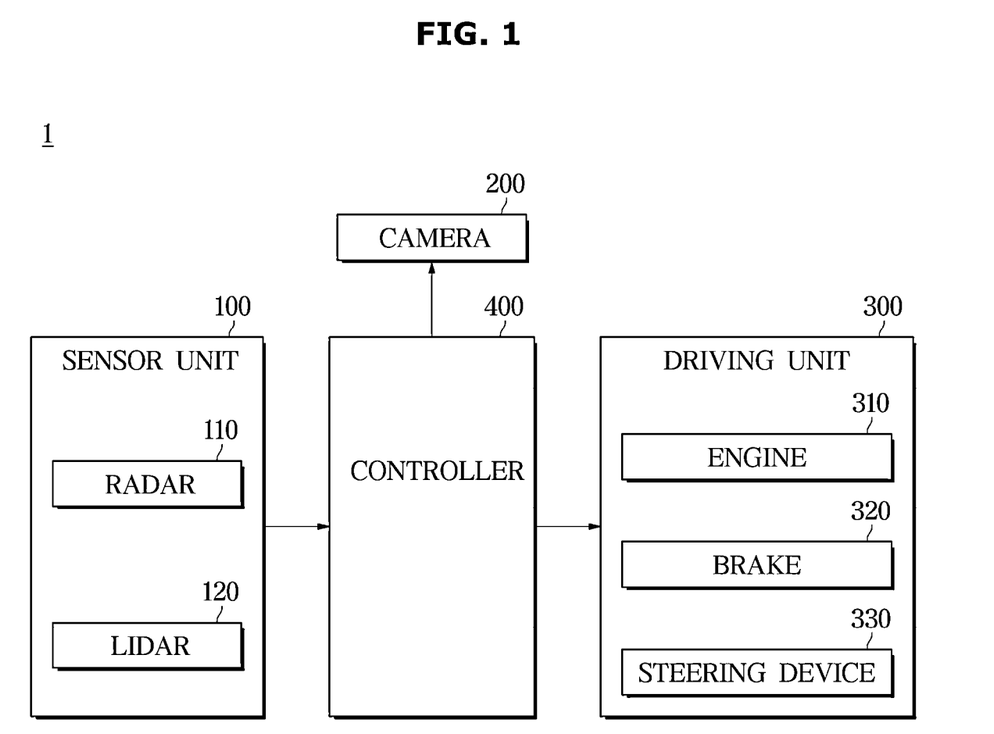
FIG. 1 is a control block diagram illustrating a vehicle according to an embodiment.

FIG. 1 is a control block diagram illustrating a vehicle according to an embodiment.

Referring to FIG. 1, a vehicle 1 according to an embodiment may include a sensor unit 100, a controller 400, a camera 200, and a driving unit 300.

The sensor unit 100 may include a radar sensor 110 and a light detection and ranging (LiDAR) sensor 120.

The radar sensor 110 may refer to a sensor that emits electromagnetic waves approximating microwaves (ultra-high frequency waves of a wavelength of 10 cm to 100 cm) to an object, and receives the electromagnetic waves reflected from the object, to detect the distance, direction, altitude, etc. with the object.

The LiDAR sensor 120 may refer to a sensor that emits a laser pulse, receives the light reflected from a surrounding target object, and measures the distance to the object and the like, to thereby precisely depict a surrounding.

The sensor unit 100 may acquire position data of one or more objects based on the above-described radar and LiDAR sensors.

Specifically, the position data of the object may include information about the distance, direction, and mobility of the object.

Meanwhile, the sensor unit 100 may utilize the characteristics of each sensor to fuse information to maintain optimal recognition performance.

The camera 200 may be configured to acquire a surrounding image including one or more objects around the vehicle 1.

According to an embodiment, the camera 200 may be provided at the front, rear, and side of the vehicle 1 to acquire an image.

The camera 200 installed in the vehicle may include a charge-coupled device (CCD) camera or a complementary metal-oxide semiconductor (CMOS) color image sensor. Here, the CCD and the CMOS may refer to a sensor that converts light received through a lens of the camera 200 into an electric signal. In detail, the CCD camera 200 refers to an apparatus that converts an image into an electric signal using a charge-coupled device. In addition, a CMOS image sensor (CIS) refers to a low-consumption and low-power type image pickup device having a CMOS structure, and serves as an electronic film of a digital device. In general, the CCD has a sensitivity superior than that of the CIS and thus is widely used in the vehicle 1, but the disclosure is not limited thereto.

The controller 400 may determine an identification area corresponding to each of the one or more objects based on the surrounding image and the position data.

The identification area may refer to an image desired to identify each object included in the image.

The identification area may refer an entire image of an object or an image in which a part of an object is occluded.

The controller 400 may identify the type of an object included in the surrounding image.

On the other hand, an image acquired by the vehicle 1 may have an occlusion area that may occur due to the position of a sensor, presence of another vehicle, and surrounding environments.

The occlusion area may refer to an area in which information about a surrounding object is not acquirable among pieces of information acquired by the camera or the sensor unit.

The controller 400 may estimate the current occlusion area based on information about the recognized object.

The controller 400 may control the vehicle such that the identification area does not overlap the occlusion area.

That is, as described below, in order to prevent the occlusion region and the identification region from overlapping each other, the controller 400 may change the velocity and steering of the vehicle. Details thereof are described below.

Meanwhile, the controller 400 may perform autonomous driving based on the identification area.

The controller 400 may identify the types of the one or more objects based on the surrounding image.

The objects included in the image may include a fixed object and a non-fixed object.

The fixed object may refer to an object, such as a guard rail, a curb, a traffic light, or a lane.

The non-fixed object may refer to an object, such as a person or a car.

The controller 400 may assign a weight to each of the one or more objects based on a predetermined criterion.

In detail, the controller 400 may assign a higher weight to a person and a lower weight to a curb.

The controller 400 may control the vehicle such that the identification area corresponding to each of the one or more objects is separated from the occlusion area based on the weight.

In detail, the controller 400 may control the vehicle such that an occlusion area of a curb having a lower weight is formed to recognize a person having a higher weight.

The controller 400 may predict a movement path of the object on the surrounding image based on the position data.

The controller 400 may predict a change in the occlusion area based on the predicted movement path of the object. For example, when a preceding vehicle is adjacent to the vehicle (i.e., a subject vehicle), the field of view of the vehicle is blocked, so it is identified that the occlusion area is increased.

The controller 400 may reduce the occlusion area by changing the distance between the vehicle and the one or more objects.

When the vehicle approaches a predetermined road, the controller 400 may reduce the occlusion area by reducing the velocity of the vehicle. The predetermined road may correspond to an intersection and a school zone.

Meanwhile, the controller 400 may reduce the overlap between the identification area and the occlusion area by changing the steering angle of the vehicle.

The controller 400 may include a memory (not shown) for storing data regarding an algorithm for controlling the operations of the components of the vehicle 1 or a program that represents the algorithm, and a processor (not shown) that performs the above described operations using the data stored in the memory. In this case, the memory and the processor may be implemented as separate chips. Alternatively, the memory and the processor may be implemented as a single chip.

Meanwhile, the vehicle 1 may include the driving unit 300.

The driving unit 300 may refer to a component for driving the vehicle 1.

The driving unit 300 may include a steering device 330 that changes a driving direction of the vehicle or controls a steering wheel of the vehicle.

In addition, the driving unit 300 may include an engine 310 for accelerating the vehicle and a brake 320 for braking. Meanwhile, the configuration of the driving unit described with reference to FIGS. 2A and 2B is a merely example, and any configuration that may change power of the vehicle may correspond to the driving unit.

Figure 2A:
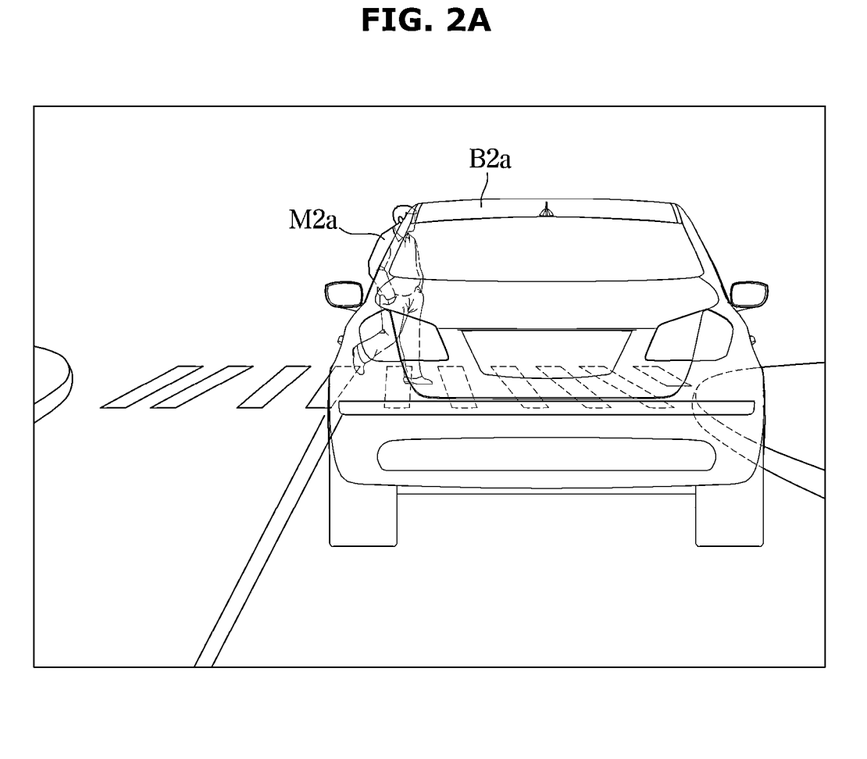
FIGS. 2A and 2B are diagrams for describing an occlusion area according to an embodiment.
Figure 2B:
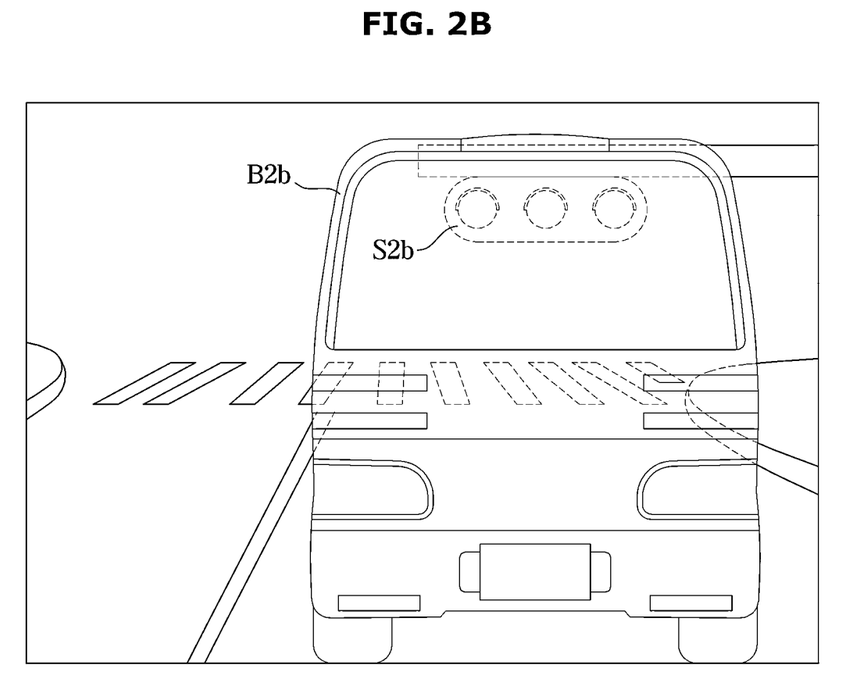

FIGS. 2A and 2B are diagrams for describing an occlusion area according to an embodiment.

Occlusion areas B2a and B2b may refer to areas that are occluded due to other objects or environments when the controller recognizes objects.

The controller may determine an identification area corresponding to each of the one or more objects based on the surrounding image and the position data, and may identify whether the occlusion area B2a or B2b overlaps in an image identified based on the above operation.

Specifically, the controller may receive information about an object transmitted from the sensor unit, to recognize or predict an occlusion of the object.

Meanwhile, the controller may estimate the current occlusion areas B2a and B2b based on the position of the vehicle sensor and the position data of the recognized object.

For example, the occlusion areas B2a and B2b may be formed by a nearby vehicle or object, and the controller 400 may predict the occurrence of an occlusion area based on the position data.

In addition, the controller may predict a movement path of objects based on the information about the object transmitted from the sensor unit.

In addition, the controller may predict a change in the estimated occlusion areas B2a and B2b according to the movement path of the object.

In addition, the controller may estimate information about an object that is expected to be occluded based on the predicted change of the occlusion areas and the predicted movement paths of the objects. In addition, the controller may track information about an object that has entered an occlusion area.

Referring to FIG. 2A, the occlusion area B2a has been formed by another vehicle that travels in front of the vehicle during travelling of the vehicle. The vehicle may acquire data of surrounding objects through a camera, radar, and LiDAR sensor. Meanwhile, the other vehicle travelling in front of the vehicle may form the occlusion area B2a by covering a part of the camera. In the case shown in FIG. 2A, the other vehicle traveling in front of the vehicle causes the occlusion area B2a to be formed in identifying a person M2a who crosses a crosswalk located in front of the other vehicle.

That is, when the controller acquires an identification area desired to identify the person M2a, an overlap may occur between the identification area and the occlusion area due to the occlusion area B2a formed by the preceding vehicle. In this case, the vehicle may control to separate the identification area of the person from the occlusion area B2a. Controlling to separate the occlusion area B2a from the identification area M2a of the person refers reducing the overlapping area between the identification area and the occlusion area.

Meanwhile, referring to FIG. 2B, a traffic light in front of the vehicle is occluded by a preceding vehicle in front of the vehicle.

In FIG. 2B, the occlusion area B2b is formed by the preceding vehicle, and an identification area S2b corresponds to the traffic light. The identification area S2b corresponding to the traffic light overlaps the occlusion area B2b formed by the preceding vehicle.

In this case, the vehicle may control to separate the identification area S2b from the occlusion area B2b. Details thereof are described below.

On the other hand, the operations described in FIGS. 2A and 2B are only an embodiment for describing the identification area and the occlusion area, and there is no limitation on the implementation of the identification area for identifying an object and the occlusion area.

Figure 3:
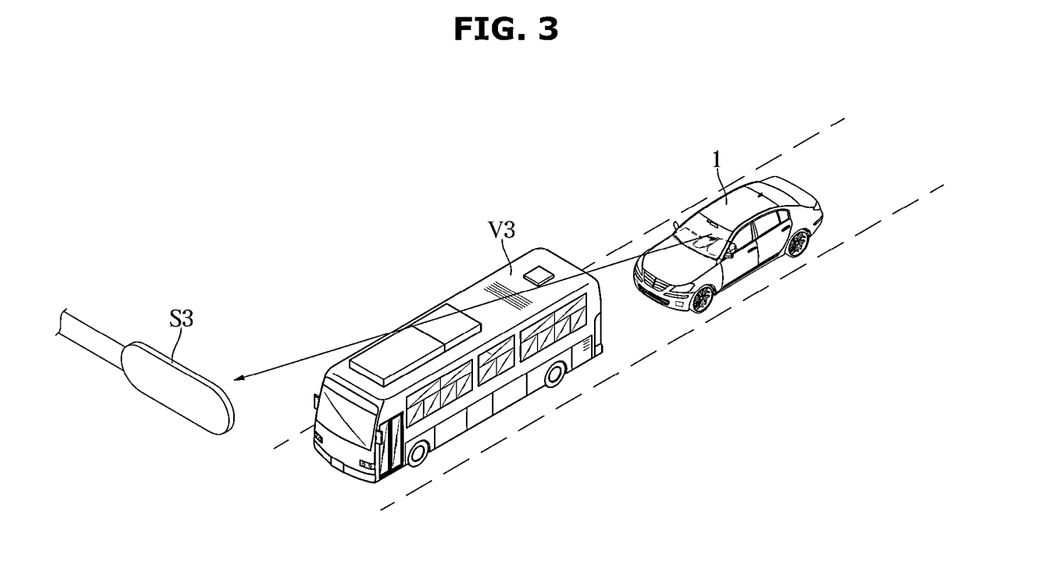
FIG. 3 is a view for describing an operation of reducing an occlusion area through a distance change of a vehicle according to an embodiment.
Figure 4:
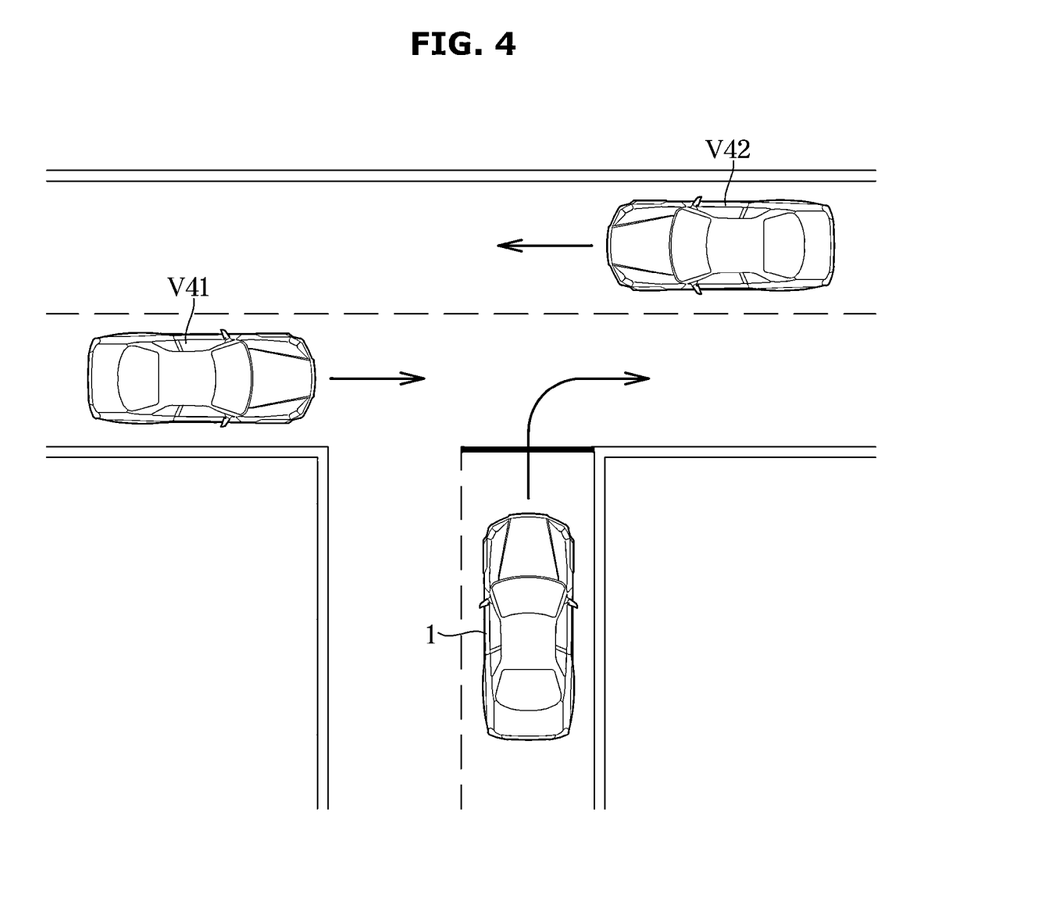
FIG. 4 is a view for describing an operation of reducing an occlusion area when a vehicle enters an intersection according to an embodiment.
Figure 5:
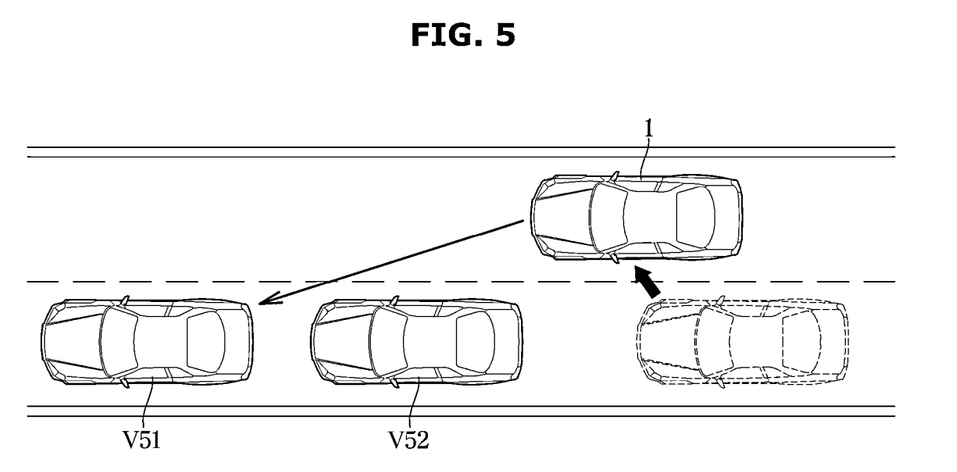
FIG. 5 is a view for describing an operation of reducing an occlusion area through a steering change of a vehicle according to an embodiment.

FIGS. 3-5 are diagrams for describing an operation of the vehicle separating an occlusion area from an identification area.

The controller 400 may predict a movement path of an object in a surrounding image based on position data of the object.

In addition, the controller 400 may predict an overlap between the identification area and the occlusion area based on the movement path.

In detail, the controller 400 may receive information about an object, an identification area, and an occlusion area acquired by the sensor unit, and may determine whether to control the vehicle to improve the cognitive performance.

That is, in response to identifying a need to control the vehicle for acquiring identification information of the object, the controller 400 may control the driving unit by calculating a control direction and a control amount.

Meanwhile, in the identification of the controller 400, a process of identifying the importance of the object may be performed.

In detail, the controller 400 may assign a weight to each object based on a predetermined criterion.

The controller may identify an important object from the perspective of vehicle control based on the recognition information.

The controller 400 may compare information about an occlusion predicted object transmitted from the controller among the important objects, and identify an object whose identification area is expected to be included in an occlusion area in the future. When an occlusion of an object having a higher weight is expected, the controller may identify whether the occlusion is removed through control of the vehicle.

The controller 400 may control the vehicle to prevent the identification area of the object from overlapping the occlusion area based on the above operations.

FIG. 3 is a diagram for describing an operation of reducing an occlusion area through a distance change of a vehicle according to an embodiment.

Referring to FIG. 3, the vehicle 1 has acquired an identification area corresponding to a traffic light S3.

In addition, an occlusion area has been formed due to a preceding bus V3. When the vehicle 1 recognizes the traffic light S3 through the identification area corresponding to the traffic light S3, the occlusion area formed by the preceding bus V3 may overlap the identification area of the traffic light S3.

In this case, the controller 400 may acquire the identification area for identifying the traffic light S3 by increasing the distance between the bus V3 and the vehicle.

In addition, the controller may acquire the identification area corresponding to the traffic light S3 by moving sideways.

FIG. 4 is a view for describing an operation of reducing an occlusion area when the vehicle 1 enters an intersection according to an embodiment.

In the case of an intersection, information may be acquired from front and sides by the camera and sensors as the vehicle is driving.

In addition, if objects V41 and V42 on the intersection are not recognized due to occlusion before the vehicle enters the intersection, the vehicle may be subject to a slow travel control until the sensor recognizes the intersection area so that the vehicle enters the intersection after safety is secured.

That is, when the vehicle 1 approaches a predetermined road, such as an intersection, the controller may control to separate a generated occlusion area from an identification area desired to identify the surrounding objects V41 and V42 by reducing the velocity.

FIG. 5 is a diagram for describing an operation of reducing an occlusion area through changing a steering angle or a driving direction of the vehicle according to an embodiment.

Referring to FIG. 5, the vehicle 1 may change the steering angle or the driving direction when an occlusion area is formed in front of a preceding vehicle in the case of a lane being occupied by a broken vehicle V51 or a lane under construction.

For example, when the broken vehicle V51 exists in front, the broken vehicle V51 may be determined as an important surrounding object. However, if an occlusion area formed by a preceding vehicle V52 overlaps an identification area corresponding to the broken vehicle V51, it is difficult for the vehicle to recognize the construction lane ahead. Accordingly, the controller may control to change the steering angle and thus the driving direction of the vehicle such that the identification area of the broken vehicle V51 is separated from the occlusion area formed due to the preceding vehicle V52.

Figure 6:
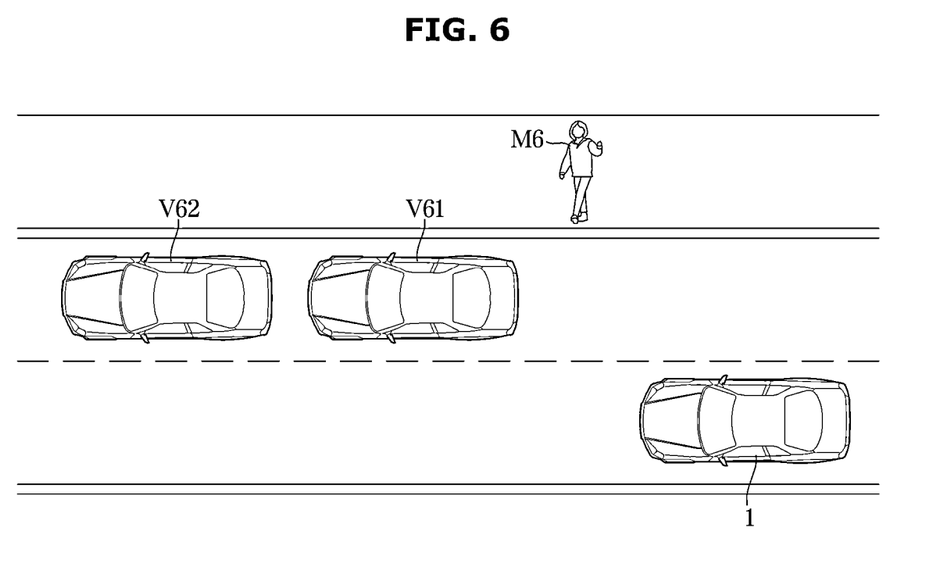
FIG. 6 is a view for describing an operation of reducing to occlusion area by reducing the velocity of a vehicle when approaching a predetermined road according to an embodiment.

FIG. 6 is a view for describing an operation of reducing an occlusion area by reducing the velocity of a vehicle when approaching a predetermined road according to an embodiment.

In FIG. 6, an operation of the vehicle traveling in a school zone is illustrated.

In the case of a school zone, the vehicle when driving autonomously may react immediately based on more information. In addition, in the school zone, the vehicle needs to recognize a child M6, i.e., a person, as a surrounding object.

The vehicle may reduce the velocity of the vehicle 1 when it is predicted that the child M6 moves into a lane in the school zone or that an occlusion is predicted to occur due to other vehicles V61, V62, or the like.

That is, when the vehicle approaches a predetermined road, such as a school zone, the controller may control to separate a generated occlusion area from an identification area desired to identify surrounding objects M6, V61, and V62 by reducing the velocity of the vehicle.

Meanwhile, the operations described with reference to FIGS. 3-6 are illustrated only for describing the disclosure, and there is no limitation in the operation of the vehicle separating the identification area and the occlusion area.

Figure 7:
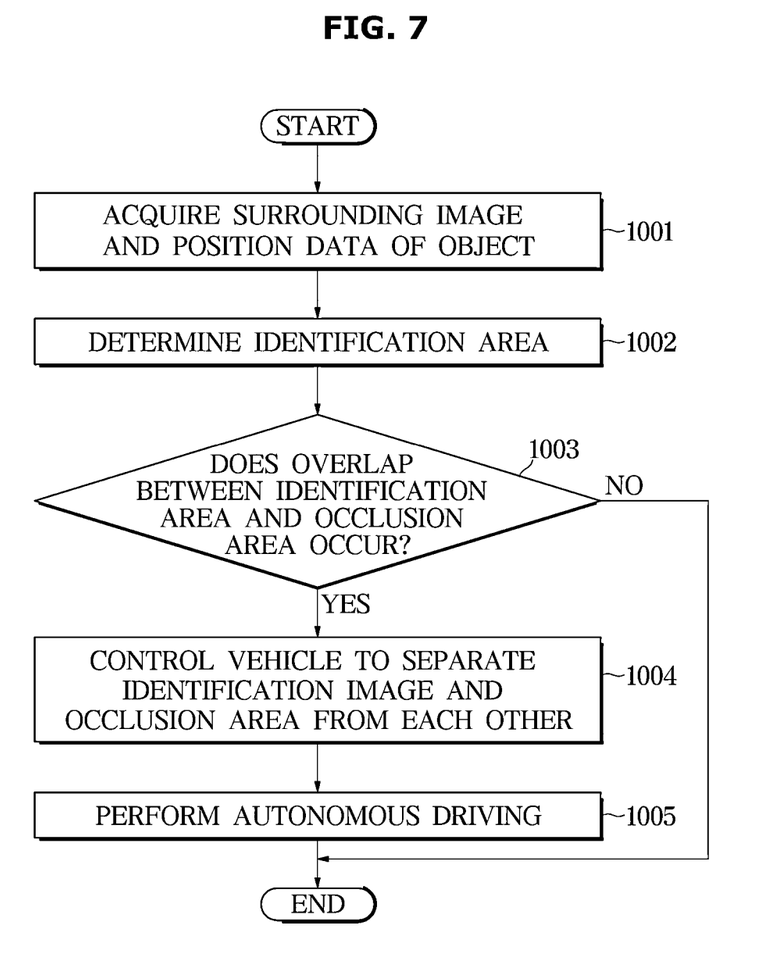
FIG. 7 is a flowchart according to an embodiment.

FIG. 7 is a flowchart according to an embodiment.

Referring to FIG. 7, the vehicle may autonomously drive, and acquire surrounding images and position data of objects through a camera and a sensor (see, step 1001).

In addition, the controller may determine an identification area corresponding to an object included in the image (see, step 1002).

Meanwhile, the controller may identify whether an overlap between the identification area and the occlusion area occurs (see, step 1003).

On the other hand, when an overlap between the identification area and the occlusion area occurs, the controller may control the vehicle to separate the identification area and the occlusion area from each other (see, step 1004). In addition, the vehicle performing such control may perform autonomous driving based on the control (see, step 1005).

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

As is apparent from the above, the vehicle can perform safe and efficient autonomous driving by acquiring accurate information about surrounding objects based on behavior control of the vehicle.

Although embodiments of the present disclosure have been described for illustrative purposes, those having ordinary skill in the art should appreciate that various modifications, additions and substitutions are possible, without departing from the scope and spirit of the disclosure. Therefore, embodiments of the present disclosure have not been described for limiting purposes.

What is claimed is:

1. A vehicle comprising:
   a camera configured to acquire a surrounding image of the vehicle, the surrounding image including an image of at least one object;
   at least one sensor configured to acquire position data of the at least one object; and
   a controller configured to
   identify an identification area corresponding to the at least one object based on the surrounding image and the position data, and
   when a part of the identification area overlaps an occlusion area, control the vehicle to separate the identification area and the occlusion area from each other, and perform autonomous driving,
   wherein the controller is configured to:
      assign a weight to the at least one object based on a predetermined criterion, and
      control the vehicle to separate the identification area and the occlusion area from each other based on the assigned weight.

2. The vehicle of claim 1, wherein the controller is configured to identify types of the at least one object based on the surrounding image.

3. The vehicle of claim 1, wherein the controller is configured to predict a movement path of the at least one object in the surrounding image based on the position data.

4. The vehicle of claim 3, wherein the controller is configured to predict an overlap between the identification area and the occlusion area based on the predicted movement path of the at least one object.

5. The vehicle of claim 1, wherein the controller is configured to change a distance between the vehicle and the at least one object to separate the occlusion area and the identification area from each other.

6. The vehicle of claim 1, wherein when the vehicle approaches a predetermined road, the controller is configured to control to separate the occlusion area and the identification area from each other by decreasing a velocity of the vehicle.

7. The vehicle of claim 1, wherein the controller is configured to control to separate the occlusion area and the identification area from each other by changing a steering angle of the vehicle.

8. A method of controlling a vehicle performing autonomous driving, the method comprising:
   acquiring, by a camera, a surrounding image of the vehicle, wherein the surrounding image includes images of at least two objects;
   acquiring, by a sensor, position data of the at least two objects;
   identifying, by a controller, identification areas respectively corresponding to the at least two objects based on the surrounding image and the position data; and
   determining, by the controller, whether a part of the identification areas overlaps an occlusion area, and controlling the vehicle to separate the overlapped part of the identification areas from the occlusion area,
   wherein controlling the vehicle to separate the overlapped part of the identification areas comprises:
      assigning a weight to the at least two object based on a predetermined criterion, and
      controlling the vehicle to separate the identification areas and the occlusion area from each other based on the assigned weights.

9. The method of claim 8, wherein identifying the identification areas includes predicting a movement path of the at least two objects in the surrounding image based on the position data.

10. The method of claim 9, wherein controlling the vehicle to separate the overlapped part of identification areas includes: predicting an overlap between the identification areas and the occlusion area based on the predicted movement path of the at least two objects.

* * * * *